United States Patent
Aono et al.

(10) Patent No.: US 12,234,787 B2
(45) Date of Patent: Feb. 25, 2025

(54) ELECTRONIC CONTROL DEVICE AND COMBUSTION STATE DETECTION SYSTEM

(71) Applicant: Hitachi Astemo, Ltd., Hitachinaka (JP)

(72) Inventors: Toshihiro Aono, Tokyo (JP); Osamu Mukaihara, Hitachinaka (JP); Kotaro Oki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/274,140

(22) PCT Filed: Sep. 15, 2021

(86) PCT No.: PCT/JP2021/033883
§ 371 (c)(1),
(2) Date: Jul. 25, 2023

(87) PCT Pub. No.: WO2022/190412
PCT Pub. Date: Sep. 15, 2022

(65) Prior Publication Data
US 2024/0426257 A1 Dec. 26, 2024

(30) Foreign Application Priority Data
Mar. 10, 2021 (JP) ................. 2021-038158

(51) Int. Cl.
*F02D 43/04* (2006.01)
*F02D 41/00* (2006.01)
*F02D 41/34* (2006.01)

(52) U.S. Cl.
CPC ......... *F02D 43/04* (2013.01); *F02D 41/0057* (2013.01); *F02D 41/009* (2013.01); *F02D 41/34* (2013.01); *F02D 2200/101* (2013.01)

(58) Field of Classification Search
CPC .... F02D 41/00; F02D 41/0057; F02D 41/009; F02D 41/34; F02D 43/04; F02D 2200/101
(Continued)

(56) References Cited

U.S. PATENT DOCUMENTS 6,029,109 A 2/2000 Rossignol et al.
6,158,273 A 12/2000 Jeremiasson et al.
(Continued)

FOREIGN PATENT DOCUMENTS

CN 111929067 A 11/2020
JP 2000-513063 A 10/2000
(Continued)

OTHER PUBLICATIONS

International Search Report (PCT/ISA/210) issued in PCT Application No. PCT/JP2021/033883 dated Oct. 26, 2021 with English translation (6 pages).
(Continued)

*Primary Examiner* — Logan M Kraft
*Assistant Examiner* — Johnny H Hoang
(74) *Attorney, Agent, or Firm* — Crowell & Moring LLP

(57) ABSTRACT

A rotation speed or a rotation time of a crankshaft at a certain angle is calculated on a basis of a change in a detection signal of a sensor of the crankshaft. Then, when a combustion cylinder is switched, information on the rotation speed or the rotation time for at least two combustion cycles is obtained, and a combustion phase is calculated on the basis of the rotation speed or the rotation time. Accordingly, by using the that measures rotation of the crankshaft, it becomes possible to detect a combustion state of the internal combustion engine with high accuracy.

6 Claims, 14 Drawing Sheets

(58) Field of Classification Search
USPC .................................................. 701/101–105
See application file for complete search history.

(56) References Cited

U.S. PATENT DOCUMENTS

| | | | | |
|---|---|---|---|---|
| 6,223,716 | B1* | 5/2001 | Kadota | ............... F02D 41/3076 |
| | | | | 123/295 |
| 10,094,316 | B2 | 10/2018 | Kitaoka et al. | |
| 2009/0157285 | A1* | 6/2009 | Weiss | .................... F02D 41/009 |
| | | | | 701/113 |
| 2010/0212632 | A1 | 8/2010 | Javaherian et al. | |
| 2011/0214495 | A1* | 9/2011 | Nishiumi | ............ F02D 41/0025 |
| | | | | 73/114.49 |
| 2012/0173127 | A1* | 7/2012 | Sano | ..................... F02D 41/009 |
| | | | | 701/105 |
| 2014/0326208 | A1* | 11/2014 | Shoda | ................. F02N 11/0851 |
| | | | | 123/179.4 |
| 2015/0337718 | A1* | 11/2015 | Saeki | .................... F02B 37/183 |
| | | | | 60/273 |
| 2017/0335784 | A1 | 11/2017 | Kitaoka et al. | |
| 2022/0220908 | A1 | 7/2022 | Sukegawa et al. | |

FOREIGN PATENT DOCUMENTS

| | | |
|---|---|---|
| JP | 2010-59883 A | 3/2010 |
| JP | 2017-106360 A | 6/2017 |
| JP | 2017-206988 A | 11/2017 |
| JP | 2020-190234 A | 11/2020 |

OTHER PUBLICATIONS

Japanese-language Written Opinion (PCT/ISA/237) issued in PCT Application No. PCT/JP2021/033883 dated Oct. 26, 2021 (4 pages).
International Preliminary Report on Patentability (PCT/IB/338 & PCT/IB/373) issued in PCT Application No. PCT/JP2021/033883 dated Sep. 21, 2023, including English translation of document C2 (Japanese-language Written Opinion (PCT/ISA/237), filed on Jul. 25, 2023). (6 pages).

* cited by examiner

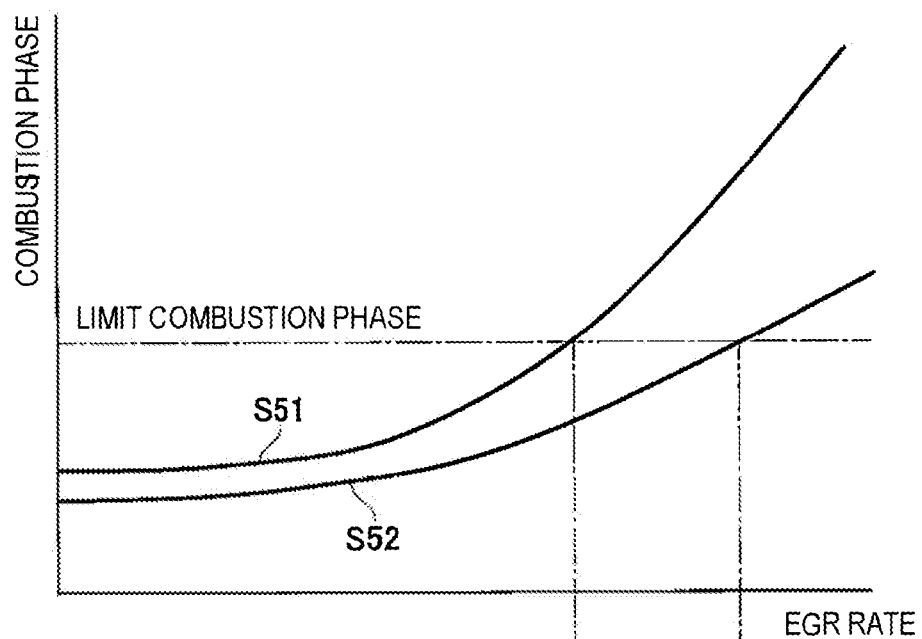
FIG. 12
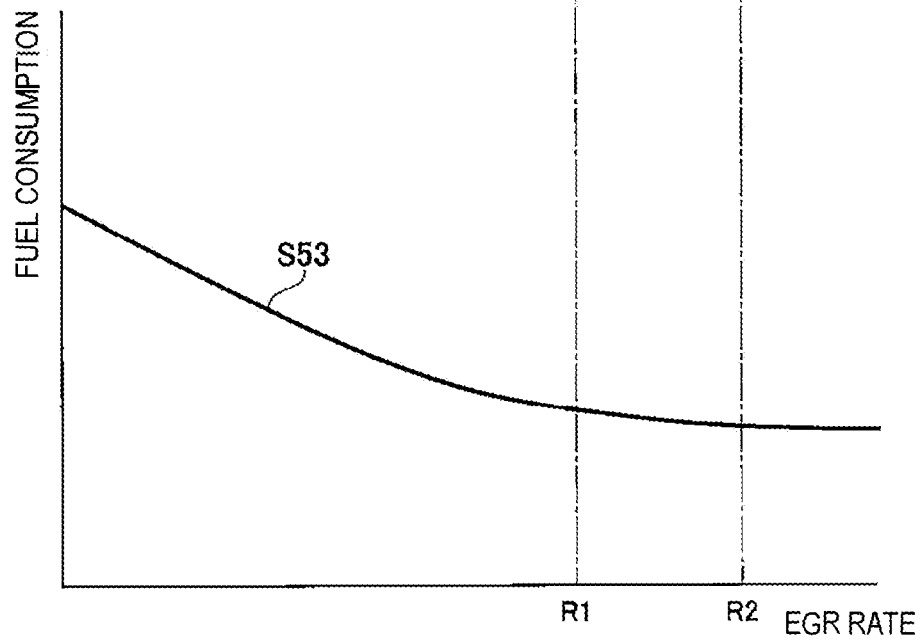

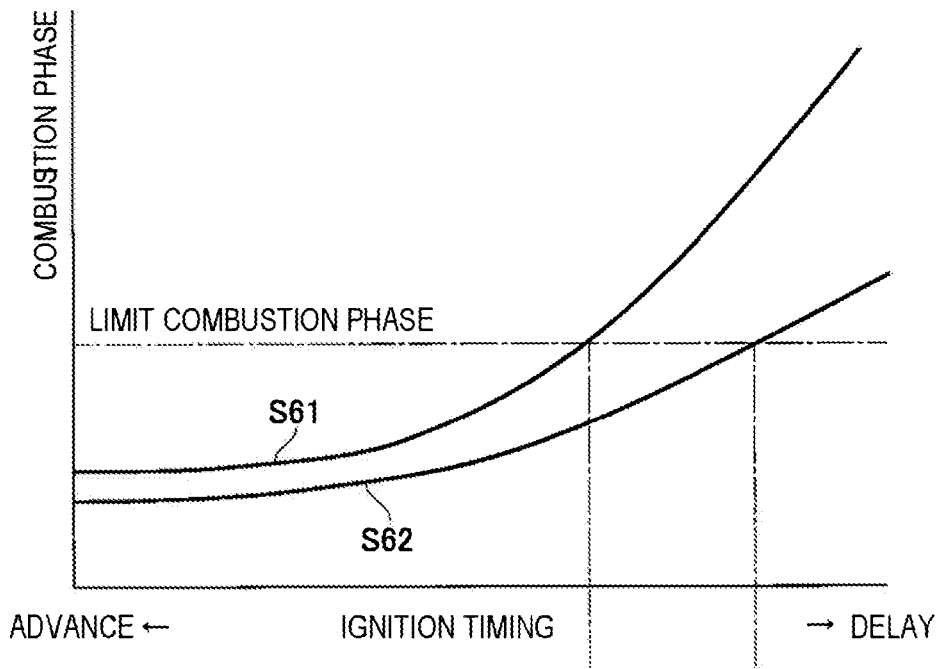
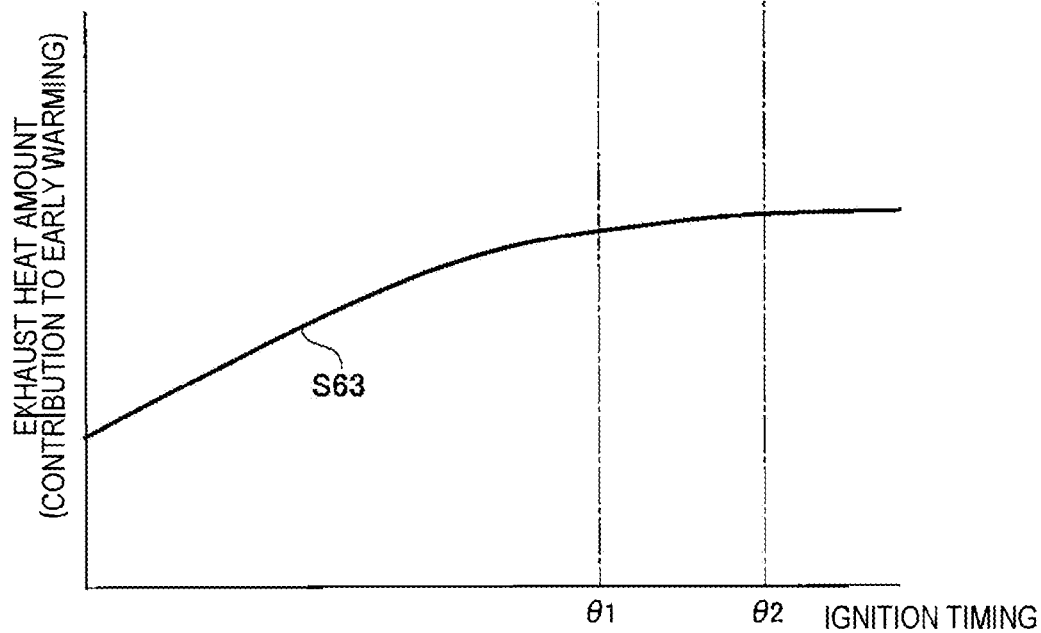
FIG. 14

ELECTRONIC CONTROL DEVICE AND COMBUSTION STATE DETECTION SYSTEM

TECHNICAL FIELD

The present invention relates to an electronic control device and a combustion state detection system.

BACKGROUND ART

In an internal combustion engine, high efficiency operation is realized by appropriately controlling intake of air, fuel injection, exhaust gas recirculation (EGR), ignition, and the like according to a combustion state. In order to realize highly efficient operation, it is important to detect the combustion state.

As a method for detecting the combustion state of the internal combustion engine, the following three methods are known.

(1) A method of an in-cylinder pressure sensor measuring a pressure caused by generation of heat in a combustion cylinder and detecting a combustion state on the basis of the pressure (2) A method of measuring ion current and detecting generation of ions caused by combustion on the basis of the ion current (3) A method of a crank angle sensor measuring rotation of a crankshaft due to generation of heat in a combustion cylinder and detecting a combustion state on the basis of the rotation time Here, in the method (1), it is necessary to add the in-cylinder pressure sensor, and in the method (2), it is necessary to modify an ignition circuit in order to measure the ion current. However, in the method (3) using the crank angle sensor, an existing crank angle sensor may be used, and the detection of the combustion state can be realized by adding software.

PTL 1 describes an engine control device that detects the combustion state by using the crank angle sensor.

That is, PTL 1 describes an angular velocity detection unit that calculates an angular velocity of the rotation of the crankshaft, an angular acceleration calculation unit that calculates an angular acceleration from the angular velocity, and a combustion control unit that controls combustion in a cylinder on the basis of a change in the angular acceleration.

Here, the angular velocity detected by the angular velocity detection unit is detected on the basis of a sectioning angle set to the crank angle of the crankshaft. In addition, the angular acceleration calculated by the angular acceleration calculation unit is calculated from angular velocities corresponding to two sectioning angles obtained in time series by the angular velocity detection unit.

In the technique described in PTL 1, when the angular velocity detection unit detects the angular velocity, processing is performed in which a plurality of types of sectioning angle patterns having different boundary positions between adjacent sectioning angles are provided, and an angular velocity is calculated on the basis of each of the plurality of types of sectioning angle patterns.

CITATION LIST

Patent Literature

PTL 1: JP 2017-106360 A

SUMMARY OF INVENTION

Technical Problem

In the technique described in PTL 1, when the angular acceleration is calculated, the angular acceleration is calculated from the angular velocities corresponding to the two sectioning angles, and thus the angular acceleration is easily affected by noise sound such as vibration sound of a road surface, and the calculation accuracy of the angular velocity may be deteriorated. In addition, since the resolution at the time of control is defined by the resolution of the crank angle sensor, there is a problem that the control capability becomes insufficient for advanced combustion control such as EGR control.

Therefore, an electronic control device and a combustion state detection system capable of detecting a combustion state of an internal combustion engine with high accuracy have been desired.

Solution to Problem

In order to solve the above problem, for example, the configuration described in the claims is adopted.

The present application includes a plurality of means for solving the above problems, and an example thereof is an electronic control device that detects a combustion state of an internal combustion engine on the basis of a signal of a crank angle sensor that measures rotation of a crankshaft of the internal combustion engine.

Further, the electronic control device includes: a crank angle synchronization processing unit that detects a change in the signal of the crank angle sensor and calculates a rotation speed or a rotation time of the crankshaft at a certain angle on the basis of a change in the sensor signal; and a time synchronization processing unit that receives information on the rotation speed or the rotation time for at least two combustion cycles from the crank angle synchronization processing unit when a combustion cylinder of the internal combustion engine is switched, and calculates a combustion phase on the basis of the received rotation speed or rotation time.

Alternatively, the electronic control device may include: a crank angle synchronization processing unit that detects a change in the signal of the crank angle sensor and calculates a rotation speed or a rotation time of the crankshaft at a certain angle on the basis of a change in the sensor signal; and a time synchronization processing unit that receives information on the rotation speed or the rotation time for at least two combustion cycles from the crank angle synchronization processing unit when a combustion cylinder of the internal combustion engine is switched, performs upsampling of the sensor signal by interpolating the received information of the rotation speed or the rotation time with the sensor signal itself with respect to a timing at which the sensor signal is received and with zero with respect to a timing at which the sensor signal is not received, calculates a combustion torque by performing filtering processing, in which a gain is proportional to a frequency up to a predetermined frequency and the gain attenuates at the predetermined frequency or more, on a result of the upsampling, and calculates a combustion phase of the internal combustion engine by searching for a peak of the calculated combustion torque.

Advantageous Effects of Invention

According to the present invention, the detection resolution of the combustion phase is improved, and a highly accurate combustion phase that is not affected by noise can be detected. Therefore, according to the present invention, for example, it is possible to perform high EGR control of taking in EGR immediately until combustion becomes unstable, and there is an effect of contributing to improvement in fuel efficiency of the internal combustion engine.

Problems, configurations, and effects other than those described above will be clarified by the following description of embodiments.

BRIEF DESCRIPTION OF DRAWINGS

FIG. 12 is a characteristic diagram illustrating an example of a relationship between the EGR rate, a fuel consumption, and a combustion phase.

FIG. 14 is a characteristic diagram illustrating an example of a relationship between an ignition timing, an exhaust heat amount, and the combustion phase.

DESCRIPTION OF EMBODIMENTS

Figure 1:
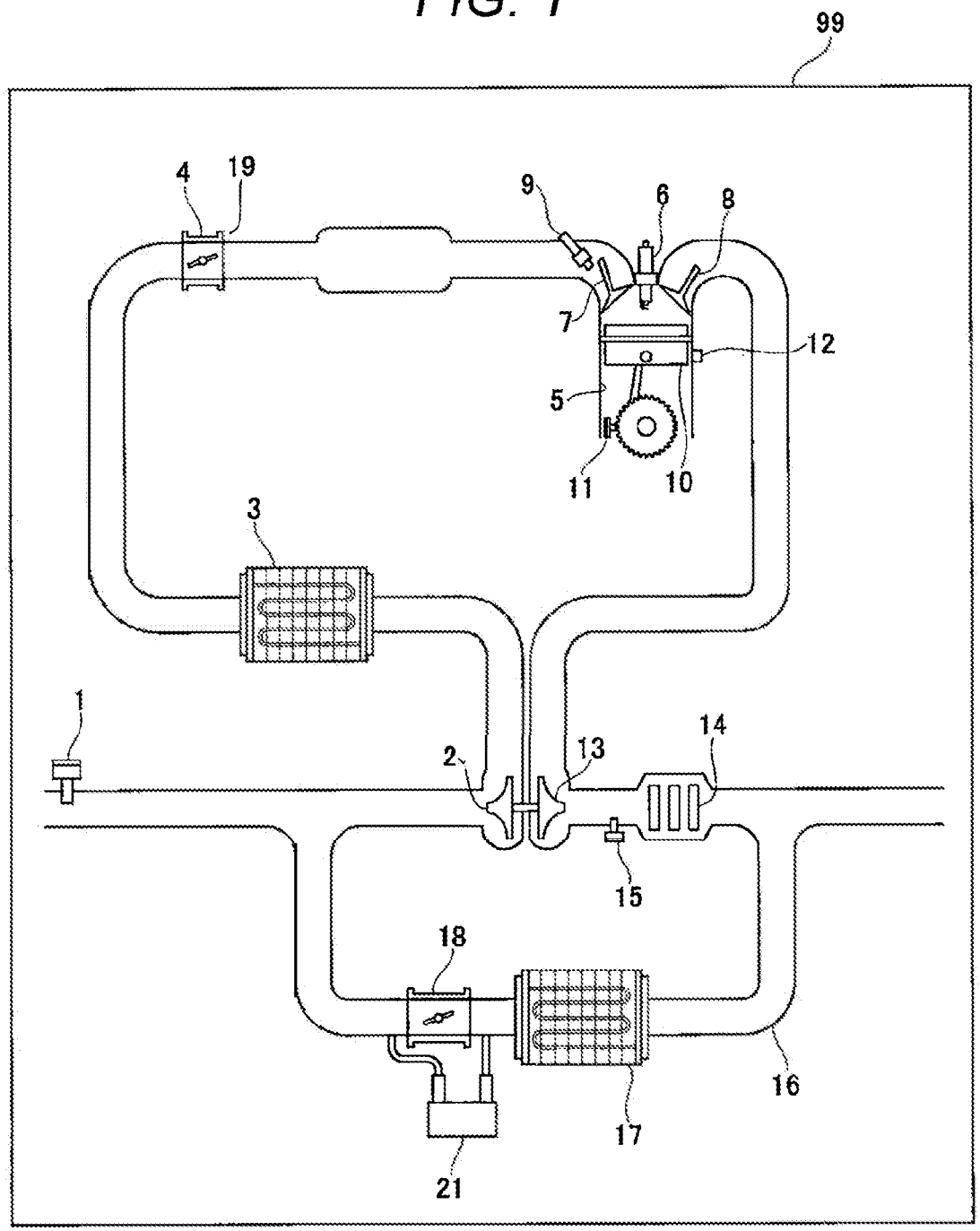
FIG. 1 is a configuration diagram illustrating an example of an internal combustion engine to which an electronic control device according to an embodiment of the present invention is applied.

Hereinafter, an electronic control device according to an embodiment (hereinafter, referred to as the "present example") of the present invention will be described with reference to the accompanying drawings.
[Configuration of Internal Combustion Engine]
FIG. 1 illustrates a configuration of an internal combustion engine 99 controlled by an electronic control device of the present example.

The internal combustion engine 99 includes an air flow sensor 1 that measures an amount of intake air, a compressor 2 that supercharges the intake air, an intercooler 3 that cools the supercharged intake air, and a throttle valve 4 that adjusts the amount of air sucked into a cylinder 5. A throttle sensor 19 for detecting the opening degree of the throttle valve 4 is provided in the vicinity of the throttle valve 4.

In addition, the internal combustion engine 99 includes an ignition plug 6 that supplies ignition energy to the cylinder 5 of each cylinder, a fuel injection device 9 that injects fuel into the cylinder 5 of each cylinder, and a piston 10 that compresses an air-fuel mixture of fuel and gas flowing into the cylinder 5. In addition, the internal combustion engine 99 includes an intake valve 7 that adjusts the air-fuel mixture flowing into the cylinder 5 and an exhaust valve 8 that discharges the exhaust gas after combustion. Note that although only one cylinder is illustrated for the cylinder 5 in FIG. 1 to simplify the description, the cylinder 5 actually includes a plurality of cylinders.

In addition, the internal combustion engine 99 includes a crank angle sensor 11 that detects a signal of a signal rotor attached to a crankshaft, and a water temperature sensor 12 that measures a temperature of cooling water. In addition, the internal combustion engine 99 includes a turbine 13 that transmits kinetic energy of the exhaust gas to the compressor 2 via a shaft, and a three-way catalyst 14 that purifies harmful substances in the exhaust gas. Then, an A/F sensor 15 that detects the concentration of oxygen contained in the exhaust gas is attached in the vicinity of the three-way catalyst 14.

In addition, the internal combustion engine 99 includes an EGR passage pipe 16 that recirculates an exhaust gas (EGR gas) from the downstream of the three-way catalyst 14 to the upstream of the compressor 2, an EGR cooler 17 that cools the EGR gas, and an EGR valve 18 that adjusts the flow rate of the EGR gas passing through the EGR passage pipe 16. Then, a differential pressure sensor 21 that detects a differential pressure before and after the EGR valve 18 is attached in the vicinity of the EGR valve 18. Here, the differential pressure before and after the EGR valve 18 is a difference between the pressure on the upstream side of the EGR valve 18 and the pressure on the downstream side in the EGR passage pipe 16.

In the internal combustion engine 99 having such a configuration, the fuel injection device 9 injects fuel into the air sucked into the cylinder 5 through the intake valve 7 to generate an air-fuel mixture. The generated air-fuel mixture explodes due to a spark generated from the ignition plug 6 at a predetermined ignition period, and pushes down the piston 10 by the combustion pressure to generate a driving force. The exhaust gas after the explosion is sent to the three-way catalyst 14 through an exhaust pipe, and harmful substances are purified by the three-way catalyst 14.

A part of the exhaust gas purified by the three-way catalyst 14 flows into the EGR passage pipe 16 without being discharged to the outside, and is used as the EGR gas. After passing through the EGR cooler 17 and the EGR valve 18, the EGR gas joins the intake air upstream of the compressor 2. Thereafter, the air-fuel mixture of the EGR gas and the intake air flows into the cylinder 5 after passing through the intercooler 3 and the throttle valve 4.

The internal combustion engine 99 controls an amount of intake air, an EGR amount, and a fuel injection amount to form an air-fuel mixture, and burns the air-fuel mixture by ignition to generate thermal energy. The thermal energy moves the piston and rotates the crankshaft through a link mechanism. The rotation of the crankshaft becomes a propulsive force of a vehicle body through a mission.

[Requirements for Improving Combustion Stability of Internal Combustion Engine]

In the internal combustion engine 99, when the EGR amount is increased, a pumping loss is reduced, so that efficiency is improved. On the other hand, in the internal combustion engine 99, when the EGR amount is increased, a combustion speed decreases, and the combustion becomes unstable eventually.

Figure 2:
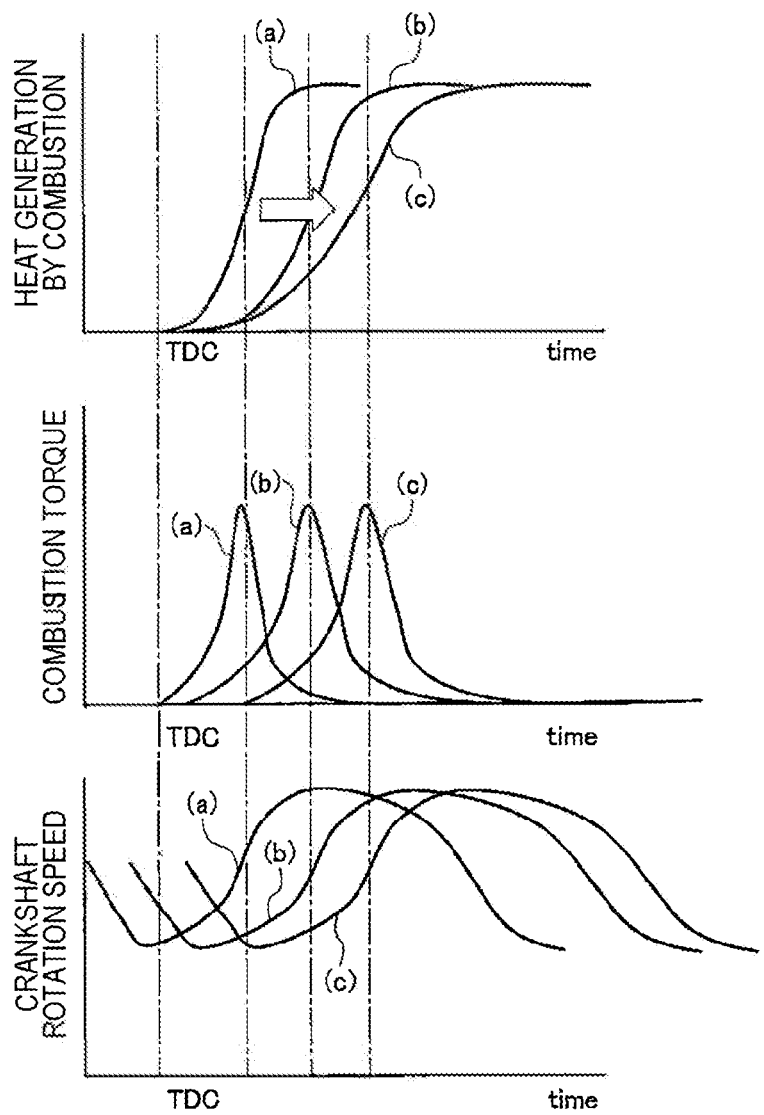
FIG. 2 is a characteristic diagram illustrating an example of a change in heat generation due to a change in an EGR rate of the internal combustion engine.

FIG. 2 illustrates an example of a change in heat generation due to a change in the EGR rate of the internal combustion engine.

The upper part of FIG. 2 compares the heat generation in three cases (a), (b), and (c) of the EGR amount. In the upper part of FIG. 2, a vertical axis represents the amount of heat generated by combustion, and a horizontal axis represents time.

In addition, the middle part of FIG. 2 illustrates the combustion torques (vertical axis) in three cases (a), (b), and (c), and the lower part of FIG. 2 illustrates the crankshaft rotation speeds (vertical axis) in three cases (a), (b), and (c), and each horizontal axis represents time.

In three cases illustrated in the upper part of FIG. 2, (a)<(b)<(c) is satisfied in the ascending order of EGR. As illustrated in the upper part of FIG. 2, when the EGR increases, the speed at which heat is generated decreases. Then, as illustrated in the middle part of FIG. 2, when the heat generation is delayed, the peak of the combustion torque is also delayed in conjunction therewith. Furthermore, as illustrated in the lower part of FIG. 2, when the peak of the combustion torque is delayed, the rotation of the crankshaft is also delayed.

Such a change in the heat generation speed (the heat generation speed is obtained by time-differentiating the heat generation amount in the upper part of FIG. 2) due to the change in the EGR rate can be detected, for example, by observing a pressure change in the cylinder by using an in-cylinder pressure sensor. By detecting the heat generation speed by using the in-cylinder pressure sensor and increasing the EGR rate when the heat generation speed becomes lower than a certain threshold, it is possible to ensure the stability of combustion. However, there is a problem that the in-cylinder pressureسنسور is expensive. In this regard, in the case of the present example, the combustion speed is detected on the basis of the internal combustion engine rotation speed measured by the crank angle sensor.

An in-cylinder pressure P, a combustion torque $\tau_{comb}$, and a rotation speed $\omega$ of the internal combustion engine have relationships represented by the following [Expression 1] and [Expression 2].

$$\tau_{comb} = \frac{P_{comb} A_{cyl} R \sin(\alpha + \beta)}{\cos\alpha} \quad \text{[Expression 1]}$$

$$J\dot{\omega} = \tau_{comb} + \tau_{fric} + \tau_{iner} + \tau_{load} \quad \text{[Expression 2]}$$

Figure 3:
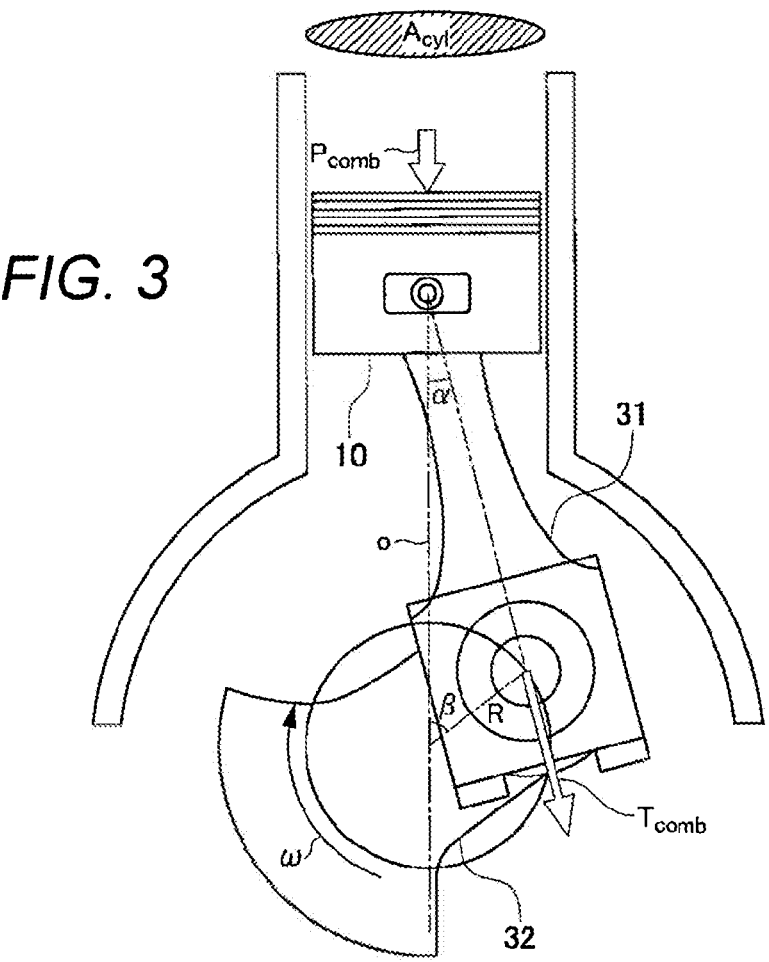
FIG. 3 is a configuration diagram illustrating an example of a link mechanism from a piston to a crankshaft.

Angles $\alpha$ and $\beta$ and a length R in [Expression 1] are as illustrated in the drawing of the internal combustion engine of FIG. 3. That is, as illustrated in FIG. 3, the angle $\alpha$ indicates an angle between a connecting rod 32 and a central axis o, and the angle $\beta$ indicates an angle between a crank arm 31 and the central axis o. The length R is the length of the crank arm 31, the in-cylinder pressure is indicated by $P_{comb}$, and the cylinder cross-sectional area is indicated by $A_{cyl}$.

When the generation of heat by combustion is accelerated, the peak of the in-cylinder pressure $P_{comb}$ is accelerated, and the peak of the combustion torque is also accelerated as illustrated in the middle part of FIG. 2. Since the combustion torque is the derivative of the rotation speed, that is, the rotational acceleration multiplied by the inertia of the rotational system, the peak of the heat generation can be estimated by searching for the peak of the derivative of the rotation speed $\omega$.

Incidentally, in a case where the rotation speed $\omega$ is obtained by the crank angle sensor, the measurement accuracy of the rotation speed $\omega$ is determined by the resolution of the crank angle sensor. For example, in a case where the crank angle sensor is a sensor that outputs a pulse every rotation of 10°, the resolution is insufficient as compared with 1° of the resolution expected at the time of controlling the combustion phase. In addition, even when the rotation speed $\omega$ obtained discretely is differentiated, the torque cannot be smoothly obtained.

Therefore, in the present example, processing is performed in which the rotation speed $\omega$ is approximated by a trigonometric function, and the approximated function is differentiated, so that the rotation speed $\omega$ at a pitch of 10° is differentiated to obtain the combustion torque at a pitch of 1°.

Here, it is considered to realize differential operation by a filter.

First, as shown in the following [Expression 3], a filter that differentiates w is denoted by g(t).

$$\dot{\omega}(t) = \int g(\tau)\omega(t-\tau)d\tau \quad \text{[Expression 3]}$$

Fourier transform is performed on both sides of [Expression 3] to obtain the following [Expression 4]. In [Expression 4], j is an imaginary unit, f is a frequency, $\Omega$ is the Fourier transform of $\omega$, and G is the Fourier transform of a filter g.

$$j2\pi f \Omega = G\Omega \quad \text{[Expression 4]}$$

From this, it can be seen that the Fourier transform G of the filter g having the differential characteristic may be expressed by [Expression 5].

$$G = j2\pi f \quad \text{[Expression 5]}$$

Figure 4A:
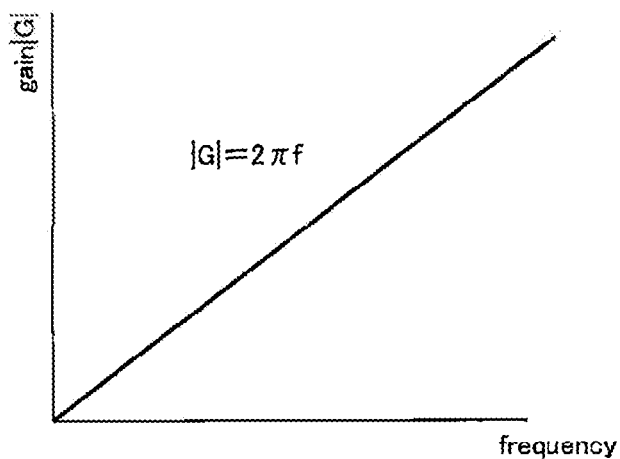
FIGS. 4A to 4C are characteristic diagrams illustrating an example of frequency characteristics of a differential filter that calculates a combustion torque from a rotation angular velocity according to the embodiment of the present invention.
Figure 4B:
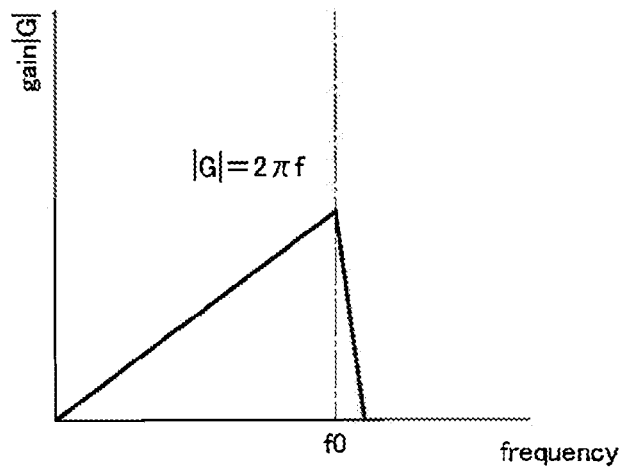
Figure 4C:
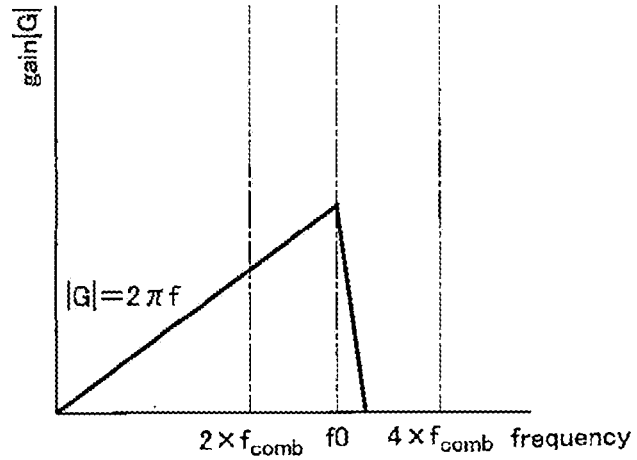

Therefore, in the frequency-gain characteristic of the Fourier transform G of the filter g having the differential characteristic, the frequency f and a gain |G| are proportional to each other as illustrated in FIG. 4A. In FIGS. 4A, 4B, and 4C, a vertical axis represents the gain |G|, and a horizontal axis represents the frequency f. As described above, the frequency f and the gain |G| are proportional to each other, but since there is noise in an actual signal, it is necessary to cut the noise.

Therefore, in the case of the present example, as illustrated in FIG. 4B, a filter that attenuates the gain is used at a frequency larger than a predetermined frequency f0. Here, the predetermined frequency at which the gain is attenuated is set by experimentally examining the combustion torque or the rotation speed.

Figure 5:
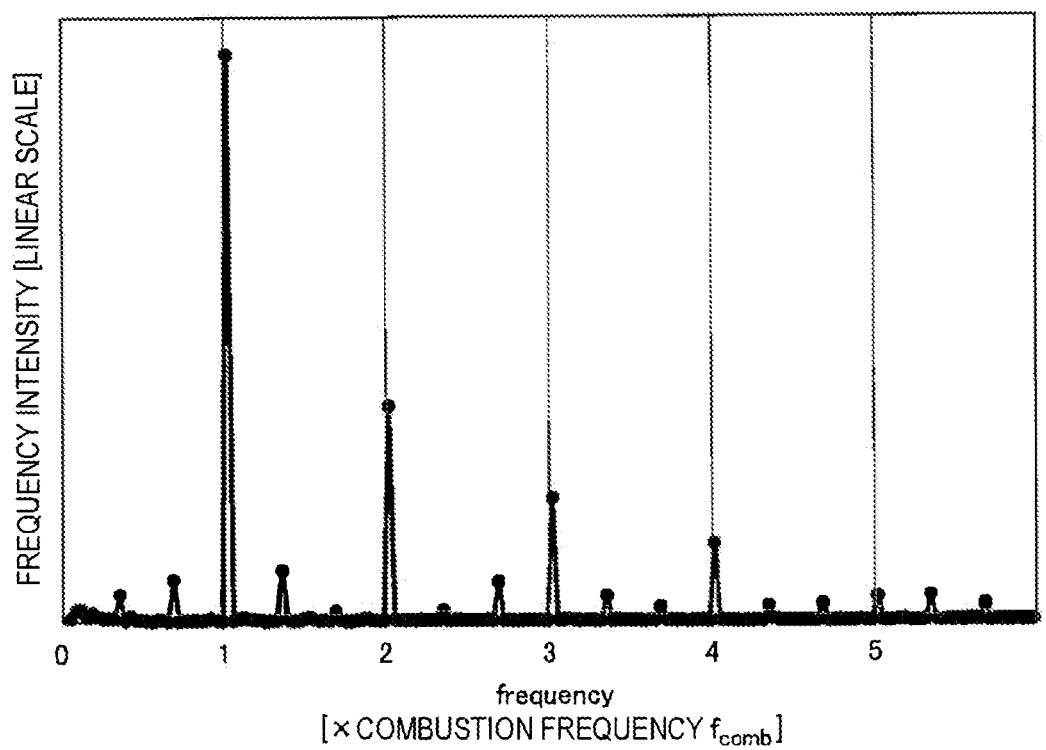
FIG. 5 is a characteristic diagram illustrating a result of Fourier transform of a rotation speed according to the embodiment of the present invention.

FIG. 5 illustrates a result of Fourier transform of the rotation speed. In FIG. 5, a horizontal axis represents a frequency, and a vertical axis represents a frequency intensity on a linear scale. As illustrated in FIG. 5, the frequency component of the rotation speed is such that combustion frequency > two times combustion frequency > three times combustion frequency > four times combustion frequency, and the frequency component attenuates as the frequency increases. Furthermore, it is illustrated that the component of five times the combustion frequency is almost the same as the level of noise. Therefore, when the frequency f0 at which the gain is attenuated is set to four times or less the combustion frequency, it is sufficient to reproduce the combustion torque. Even when the frequency is set to be higher than this, only noise is picked up, and thus the accuracy can be improved by setting the frequency to be four times or less.

Figure 6:
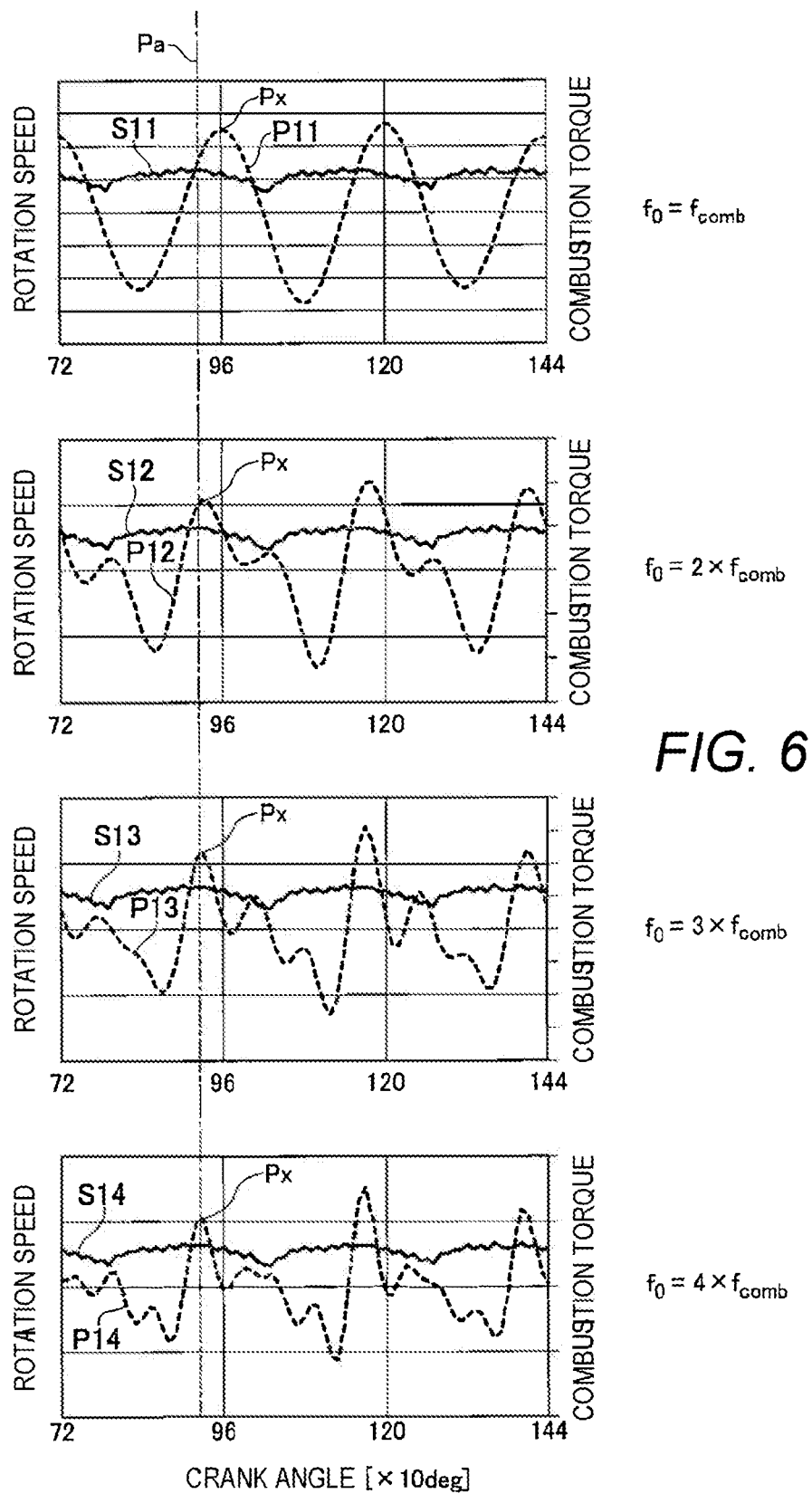
FIG. 6 is a relationship diagram between the rotation speed and the combustion torque according to the embodiment of the present invention.

FIG. 6 illustrates rotation speeds S11, S12, S13, and S14 (solid lines) and combustion torques P11, P12, P13, and P14 (broken lines) when the frequency f0 for attenuating the gain is set to the combustion frequency (uppermost part), two times (second part), three times (third part), and four times (lowermost part) thereof. In each drawing, a horizontal axis represents the crank angle, a vertical axis represents the rotation speed, and a position Px of the combustion peak of the combustion torque P11, P12, P13, P14 is illustrated in the drawing. In addition, in the four drawings, a line Pa for comparing the position Px of the combustion peak is illustrated at the same position.

As illustrated in the uppermost part of FIG. 6, it can be seen that when the frequency f0 at which the gain is attenuated is the combustion frequency, the combustion torque P11 is not appropriately reproduced, and in particular, the position Px of the peak is not sufficiently reproduced. On the other hand, as illustrated in the second part, the third part, and the lowermost part of FIG. 6, it can be seen that the combustion torques P12, P13, and P14 are appropriately reproduced when the combustion frequency is set to two times, three times, and four times, respectively, and in particular, the position Px of the peak is reproduced to coincide with the line Pa. In addition, there is almost no difference in the peak position Px between two times and four times.

Therefore, as illustrated in FIG. 4C, the frequency at which the gain is attenuated is preferably set within a frequency range of about two times to four times the combustion frequency $f_{comb}$. Note that the combustion frequency $f_{comb}$, is a reciprocal of the combustion cycle $\theta_{comb}$, and the combustion cycle $\theta_{comb}$, is an interval at which combustion occurs and is 720°/number of cylinders. By setting the frequency f0 for attenuating the gain in this manner, it is possible to achieve both the accuracy of reproduction of the combustion torque and the robustness against noise.

Therefore, as illustrated in FIG. 4B, it is sufficient to prepare a filter in which the gain is proportional to the frequency f up to a predetermined frequency f0 and the gain attenuates at a frequency larger than the predetermined frequency f0.

Such a filter can be designed by inverse Fourier transform, a window function method, or the like. With the filter g designed in this manner, the differentiation of ω can be calculated by [Expression 6] and [Expression 7]. Here, N is a ratio between an interval $\theta_{sen}$ of the crank angle sensor and a combustion torque resolution $\theta_{est}$ to be obtained, $\omega_N$ is the rotation angular velocity of the resolution $\theta_{sen}$ obtained by the crank angle sensor, ω is the rotation angular velocity of the combustion torque resolution $\theta_{est}$, and L is the length of the filter, that is, a ratio between the combustion cycle $\theta_{comb}$ and the combustion torque resolution $\theta_{est}$.

$$\dot{\omega}(Nn+m) = \sum_{i=0}^{L} g(l)\omega(Nn+m-l)$$ [Expression 6]

$$\omega(Nn+m) = \begin{cases} \omega_N(n) & m = 0 \\ 0 & m \neq 0 \end{cases}$$ [Expression 7]

Figure 7:
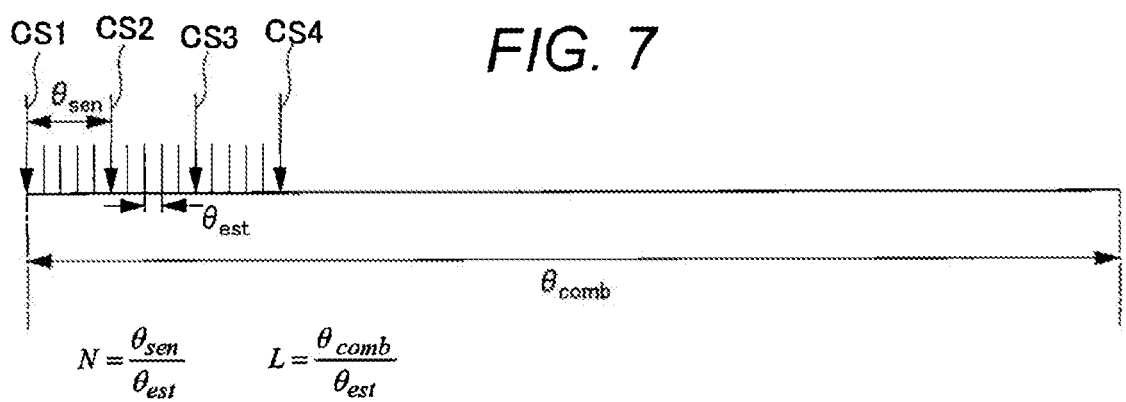
FIG. 7 is an explanatory diagram illustrating a relationship among a crank angle sensor signal interval, a combustion torque resolution, and a combustion cycle.

Note that the relationship among $\theta_{sen}$, $\theta_{est}$, $\theta_{comb}$, N, and L is summarized in FIG. 7.

As illustrated in FIG. 7, crank angle sensor signals CS1, CS2, CS3, CS4, and so on are obtained at the intervals $\theta_{sen}$, and the ratio ($\theta_{sen}/\theta_{est}$) between the interval $\theta_{sen}$ and the combustion torque resolution $\theta_{est}$ to be obtained is denoted by N. In addition, the ratio ($\theta_{comb}/\theta_{est}$) of the combustion cycle $\theta_{comb}$/combustion torque resolution $\theta_{est}$ is denoted by L.

Since combustion occurs at constant intervals, the combustion torque and the crank rotation speed have periodicity. The cycle is a combustion cycle $\theta_{comb}$=720°/number of cylinders.

In FIG. 4B, it has been described that the attenuation frequency f0 of the filter for smoothing the rotation speed is desirably two times to four times the combustion frequency. The combustion frequency $f_{comb}$ is a reciprocal of the combustion cycle $\theta_{comb}$, and in the example illustrated in FIG. 4C, the combustion frequency $f_{comb}$ is set between two times the combustion frequency $f_{comb}$ ($f_{comb}$×2) and four times the combustion frequency $f_{comb}$ ($f_{comb}$×4).

Figure 8:
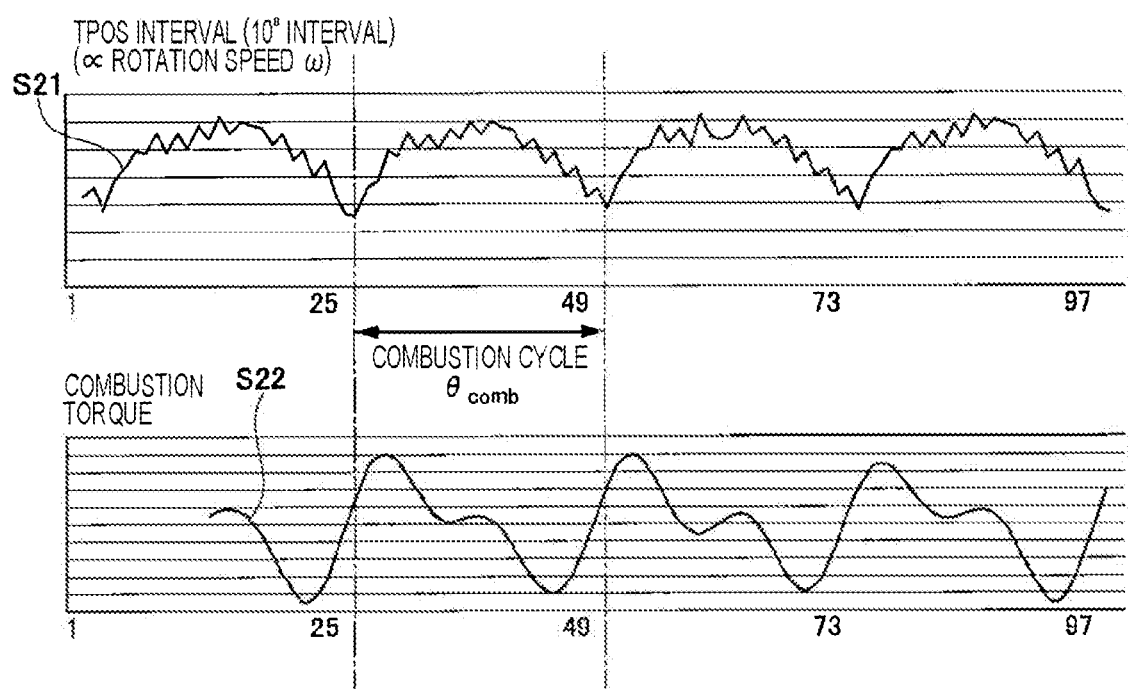
FIG. 8 is a characteristic diagram illustrating an example of the rotation speed/rotation time of the crankshaft and the periodicity of the combustion torque.

The upper part of FIG. 8 illustrates a change S21 in the crank rotation speed, and the lower part of FIG. 8 illustrates a change S22 in the combustion torque. The vertical axis represents the values of the crank rotation speed and the combustion torque, and the horizontal axis represents time.

As illustrated in FIG. 8, the combustion torque S22 and the crank rotation speed S21 have periodicity that changes for each combustion cycle co.

As shown in [Expression 8], when the length L of the filter is determined in accordance with the combustion cycle $\theta_{comb}$, noise on the crank angle sensor signal can be efficiently removed. This is because the signal is repeated in the combustion cycle.

$$L = \frac{\theta_{comb}}{\theta_{est}}$$ [Expression 8]

[Configuration of Combustion State Detection Device]

Next, a configuration of a combustion state detection system that obtains the combustion torque by filtering the rotation speed obtained from the crank angle sensor and detects the combustion peak in the processing described above will be described.

Figure 9:
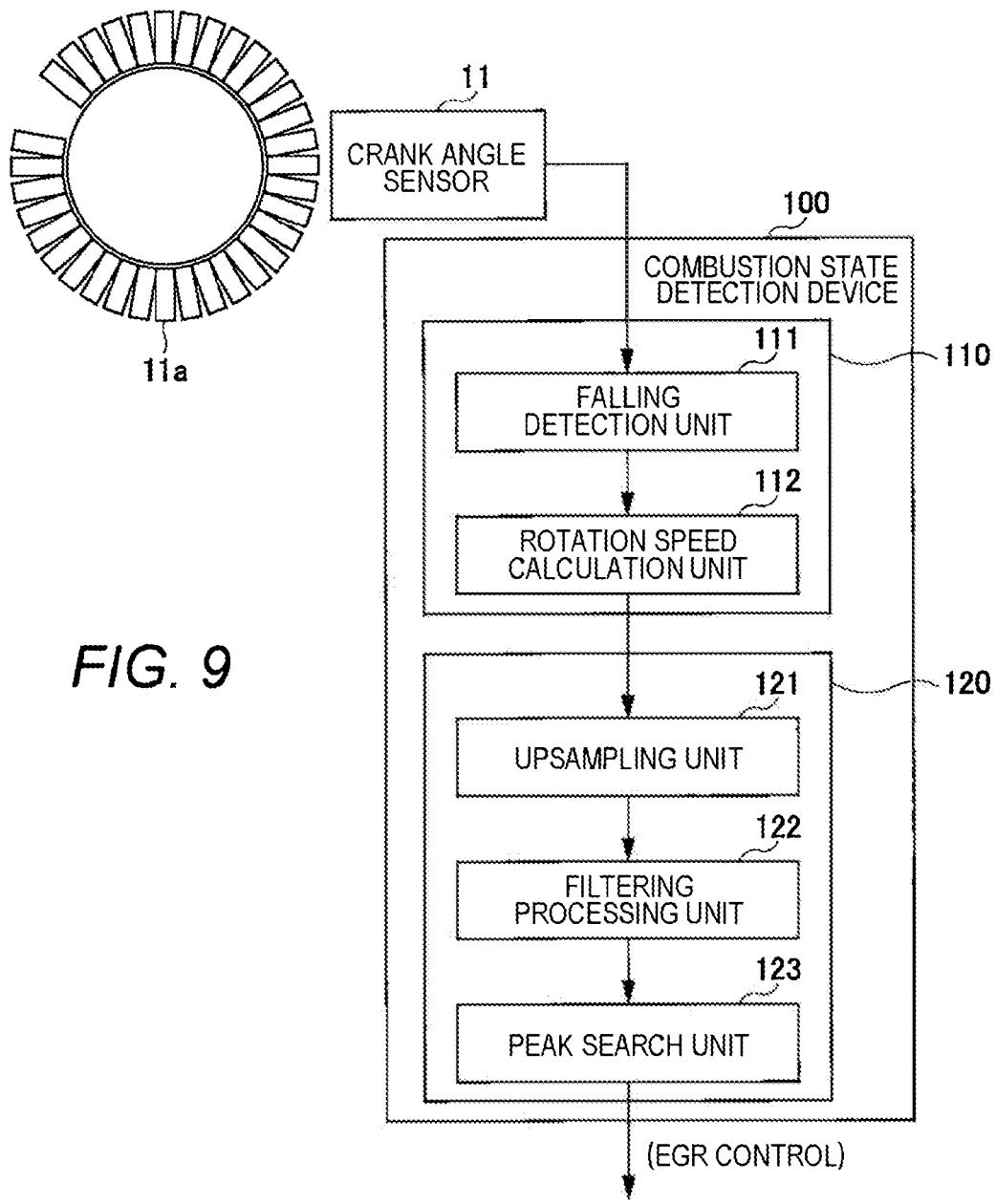
FIG. 9 is a block diagram illustrating a configuration example of a combustion state detection device according to the embodiment of the present invention.

FIG. 9 illustrates a configuration of a combustion state detection device 100 to which the combustion state detection system of the present example is applied.

The combustion state detection device 100 includes a crank angle synchronization processing unit 110 and a time synchronization processing unit 120.

In the detection of the combustion state of the internal combustion engine, when all the processing is performed in a concentrated manner by one processing unit in synchronization with the input of the crank angle sensor detection signal, the load is concentrated, which is not desirable.

Therefore, it is preferable that the functions are shared and processed by the crank angle synchronization processing unit 110 and the time synchronization processing unit 120 as illustrated in FIG. 9.

The crank angle synchronization processing unit 110 performs processing of calculating the rotation speed from the acquisition of the crank angle sensor detection signal. Then, the crank angle synchronization processing unit 110 passes the information of the rotation speed for at least two combustion cycles to the time synchronization processing unit 120 to be activated at constant time intervals (for example, every 10 ms).

The time synchronization processing unit 120 performs processing of estimating the combustion torque from the received rotation speed for two combustion cycles and detecting the peak of the combustion torque as the combustion phase.

Hereinafter, when the configuration illustrated in FIG. 9 is described, the detection signal of the crank angle sensor 11 is a signal that repeats on and off in synchronization with the unevenness of the tooth attached to the crankshaft, and is a pulse signal that falls every time the crankshaft rotates by a certain angle, for example, 10°.

A falling detection unit 111 of the crank angle synchronization processing unit 110 detects the falling timing of the detection signal of the crank angle sensor 11.

A rotation speed calculation unit 112 calculates the time from the falling timing detected by the falling detection unit 111 to the next falling timing, and calculates the crank rotation speed by taking the reciprocal of the calculated time or dividing the interval between the teeth attached to the crankshaft by the calculated time.

The time synchronization processing unit 120 is activated at constant time intervals such as 10 ms, and when detecting the switching of the combustion cylinder from a cylinder determination signal, receives the rotation speed for the past two combustion cycles from the crank angle synchronization processing unit 110.

An upsampling unit 121 upsamples the signal of the angular resolution of the pitch $\theta_{sen}$ (for example, 10°) of the crank angle sensor 11 to improve a sampling rate to the detection resolution $\theta_{est}$ (for example, 1°).

Figure 10A:
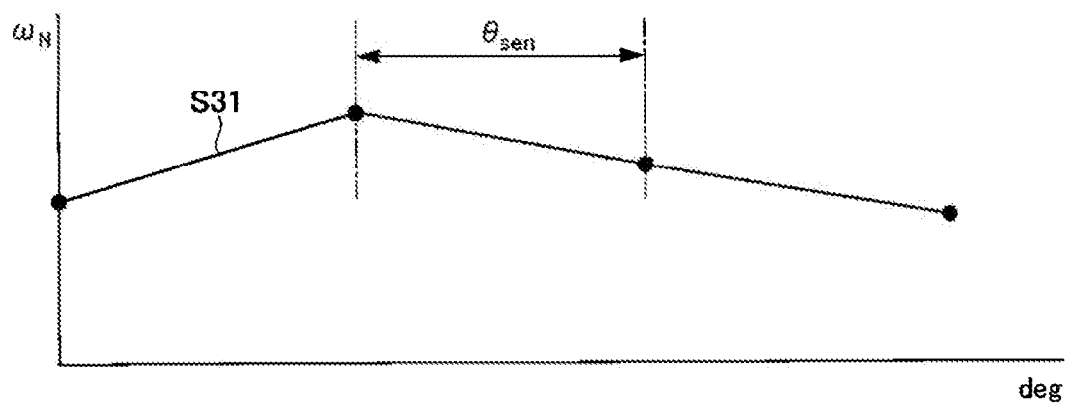
FIGS. 10A and 10B are characteristic diagrams illustrating an example of a state in which the rotation speed is upsampled.
Figure 10B:
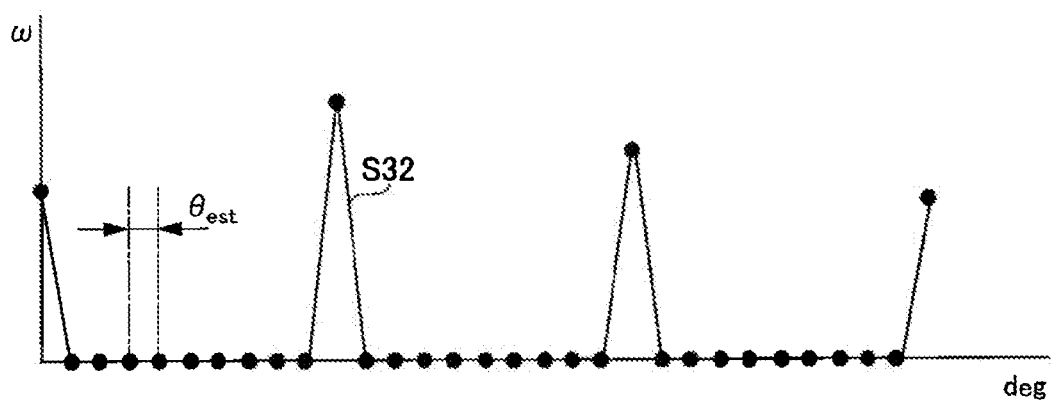

FIGS. 10A and 10B illustrate processing in the upsampling unit 121. Here, the received rotation speed is denoted by $\omega_N$ (the vertical axis in FIG. 10A), and the rotation speed after the resolution improvement is denoted by w (the vertical axis in FIG. 10B). As shown in the following [Expression 9], by using the data S32 obtained by performing the processing of inserting "0" into the data S31 illustrated in FIG. 10A at timing other than the falling timing (m≠0) as illustrated in FIG. 10B, the angular resolution of the rotation speed can be improved.

$$\omega(Nn+m) = \begin{cases} \omega_N(n) & m = 0 \\ 0 & m \neq 0 \end{cases} \qquad \text{[Expression 9]}$$

As illustrated in FIG. 4B, a filtering processing unit 122 calculates the combustion torque by filtering the upsampled rotation speed ω with a characteristic that the gain is proportional to the frequency up to the predetermined frequency f0, and the gain attenuates when the frequency exceeds the predetermined frequency f0.

By performing the processing in this manner, it is possible to estimate the smooth combustion torque with high resolution as illustrated in the lower part of FIG. 8 from the rotation speed with rough resolution as illustrated in the upper part of FIG. 8.

The upsampled w has a conspicuous component of the cycle $\theta_{sen}$ as illustrated in FIG. 10B. That is, as illustrated in FIG. 10A, compared to the data S31 obtained by sampling rotation speed $\omega_N$ as it is, in ω of data S32 obtained by upsampling to the combustion torque resolution $\theta_{est}$, only a component synchronized with cycle $\theta_{sen}$ of the sensor signal is conspicuous as illustrated in FIG. 10B.

Figure 11:
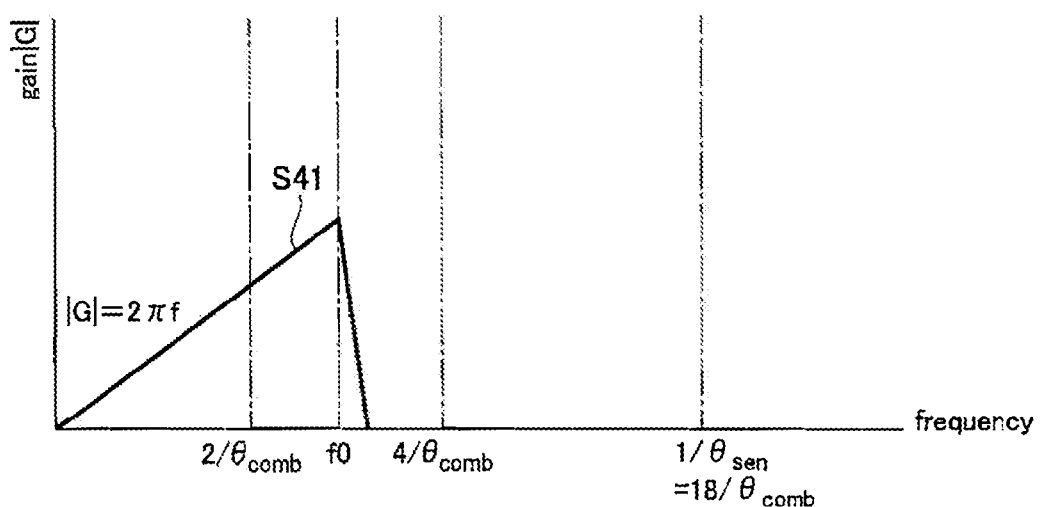
FIG. 11 is a characteristic diagram illustrating characteristics of a filter of FIG. 4C with a horizontal axis focused on a reciprocal $\theta_{comb}$ of a combustion frequency.

FIG. 11 illustrates a characteristic S41 obtained by correcting the characteristic of the filter of FIG. 4C by focusing on the reciprocal $\theta_{comb}$, of the combustion frequency $f_{comb}$ on the horizontal axis. In FIG. 11, a vertical axis represents the gain, and a horizontal axis represents the frequency. Assuming an interval of 10° between teeth attached to a normal crankshaft and a four-cylinder internal combustion engine, the sampling cycle $\theta_{sen}$ of the rotation speed ω is as shown in the following [Expression 10].

$$\theta\,\text{sen} = 10° \qquad \text{[Expression 10]}$$
$$\theta\,\text{comb} = 720°/4 = 180°$$
$$\theta\,\text{sen} = \theta\,\text{comb}/18$$

Since the sampling cycle $\theta_{sen}$ of the rotation speed belongs to the region where the gain of the filter is attenuated, as described in FIGS. 10A and 10B, the components of the conspicuous sampling cycle are smoothed by upsampling, and the combustion torque synchronized with the combustion cycle is smoothly obtained.

That is, processing in which the received information of the rotation speed or the rotation time is interpolated with the sensor signal itself with respect to the timing at which the sensor signal is received and with zero with respect to the timing at which the sensor signal is not received is performed as the upsampling. Then, with respect to the upsampling result, the combustion torque is calculated by performing filtering processing in which the gain is proportional to the frequency up to a predetermined frequency and the gain attenuates at the predetermined frequency or more, and the peak of the calculated combustion torque is searched for to calculate the combustion phase of the internal combustion engine, whereby the combustion torque synchronized with the combustion cycle is smoothly obtained.

Since the combustion torque output from the filtering processing unit 122 is repeated for each combustion cycle, a peak search unit 123 searches for a peak in each combustion cycle. Then, the peak search unit 123 sets a peak angle as the combustion phase. The information on the combustion phase searched by the peak search unit 123 is sent to an EGR control unit of the electronic control device. Note that the configuration of the EGR control will be described later with reference to FIG. 13.

As illustrated in the lower part of FIG. 8, since the combustion torque is repeated for each combustion cycle $\theta_{comb}$, it is desirable to search for the combustion peak from the combustion torque of the length of the combustion cycle. In addition, when the combustion torque is calculated, it is desirable to perform filtering utilizing the periodicity of the combustion torque or the crankshaft rotation speed. Since the cycle of the combustion torque or the crankshaft rotation speed is the combustion cycle $\theta_{comb}$, it is desirable to set the length of the filter when obtaining the combustion torque to the combustion cycle $\theta_{comb}$.

As described above, the combustion peak is searched for from the combustion torque for one combustion cycle, and each sample value of the combustion torque is calculated from the crankshaft rotation speed for one combustion cycle. On the basis of this, the combustion peak of each combustion cycle is calculated from the crankshaft rotation speed for two combustion cycles.

Therefore, assuming that the information given from the crank angle synchronization processing unit 110 that calculates the rotation speed or the rotation time to the time synchronization processing unit 120 that calculates the combustion torque and searches for the peak is the crankshaft rotation speed for two combustion cycles or the crankshaft rotation time for two combustion cycles, the combustion peak can be searched for with excellent visibility.

In addition, a case where the time synchronization processing unit is activated at intervals of 10 ms will be considered. When the four-cylinder internal combustion engine is operated at 3000 rpm, the time during which the internal combustion engine makes one rotation is 20 ms, and the time corresponding to the combustion cycle of 180° is 10 ms. Therefore, by estimating the torque and calculating the combustion peak in all the time synchronization processing activated every 10 ms, the combustion peaks corresponding to all the combustion cycles are obtained.

When the engine speed of the internal combustion engine is less than 3000 rpm, the time corresponding to the combustion cycle is longer than 10 ms, so that it is not necessary to perform combustion torque estimation and combustion peak search in all the time synchronization processing activated every 10 ms. In this regard, if it is determined that the combustion torque estimation and the combustion peak search are performed in the time synchronization processing immediately after the combustion cylinder is switched, it is possible to prevent the combustion peak search from being performed redundantly.

In addition, when the engine speed of the internal combustion engine exceeds 3000 rpm, the time corresponding to the combustion cycle becomes shorter than 10 ms, and thus the time synchronization processing also needs to be activated at a time interval shorter than 10 ms. When the number of cylinders of the internal combustion engine is denoted by C and the engine speed of the internal combustion engine is denoted by Neng [rpm], an activation interval Tjob of the time synchronization processing is given by [Expression 11].

$$Tjob = \frac{120 \cdot 1000}{C \cdot Neng} [ms] \qquad \text{[Expression 11]}$$

The combustion state detection device 100 having such a configuration enables estimation of the combustion torque with high resolution and high accuracy, and enables combustion phase detection with high accuracy on the basis of the estimation.

[Example of Calculation Using Rotation Time]

Even when the rotation speed calculation unit 112 illustrated in FIG. 9 performs required rotation time calculation processing, a change in positive/negative sign of the amplitude of the combustion torque is obtained, and the position of the combustion movement does not change.

That is, the relationship between a time T required for the crankshaft to rotate $\theta_{sen}$ and the angular velocity is as shown in [Expression 12] when T is considered to be divided into an average value $T_0$ and an AC component $T_{dev}=T-T_0$.

$$\omega = \frac{\theta_{sen}}{T_0 + T_{dev}} \approx \frac{\theta_{sen}}{T_0}\left(1 - \frac{T_{dev}}{T_0}\right) \qquad \text{[Expression 12]}$$

Therefore, when the rotation speed ω is considered to be divided into an average value ω0 and an AC component $\omega_{dev}=\omega-\omega_0$, [Expression 13] is obtained.

$$\omega_{dev} = -\frac{\theta_{sen}}{T_0^2}T_{dev} \qquad \text{[Expression 13]}$$

Since the filter g is a filter that extracts the AC component, in the example of FIG. 9, whether the filtering processing unit 122 filters the rotation speed or filters the required rotation time, only a proportionality factor is changed, and the positions of the peaks of the filtering result are the same.

Therefore, even when the rotation speed calculation unit 112 in FIG. 9 is replaced with a rotation time calculation unit (required rotation time calculation unit), a change in positive/negative sign of the amplitude of the combustion torque is obtained, and the position of the combustion peak does not change.

[Configuration for Controlling EGR Rate]

Next, the configuration of the electronic control device that controls the EGR rate on the basis of the combustion phase obtained by the combustion state detection device of the present example will be described.

FIG. 12 illustrates a relationship between the EGR rate, the combustion phase, and the fuel consumption. The upper part of FIG. 12 illustrates the relationship between the EGR rate (horizontal axis) and the combustion phase (vertical axis), and the lower part of FIG. 12 illustrates the relationship between the EGR rate (horizontal axis) and the fuel consumption (vertical axis). Two lines illustrated in the upper part of FIG. 12 indicate an upper limit characteristic S51 (upper line) and a lower limit characteristic S52 (lower line) of the combustion phase.

As illustrated in the lower part of FIG. 12, when the EGR rate is increased, a fuel consumption characteristic S53 is improved by reducing the pumping loss. On the other hand, as illustrated in the upper part of FIG. 12, a difference between the upper limit characteristic S51 and the lower limit characteristic S52 of the fuel phase also increases as the combustion phase is delayed. That is, FIG. 12 illustrates that the combustion becomes unstable when the EGR rate is increased.

In this regard, in order to avoid the operation in such an unstable region, the detected combustion phase is compared with a preset limit combustion phase as shown in [Expression 14].

[Combustion Phase Detection Value] > [Limit Combustion Phase]     [Expression 14]

When the relationship of [Expression 14] is satisfied, the electronic control device preferably performs control to reduce the EGR rate.

Alternatively, a variation in the combustion phase is calculated, and it is determined whether the relationship shown in [Expression 15] is satisfied.

[Variation in Combustion Phase] >  [Expression 15]
[Allowable Value of Combustion Phase Variation]

When the relationship of [Expression 15] is satisfied, the electronic control device performs control to reduce the EGR rate, thereby increasing the EGR rate to the utmost and reducing the margin of the EGR rate control.

Figure 13:
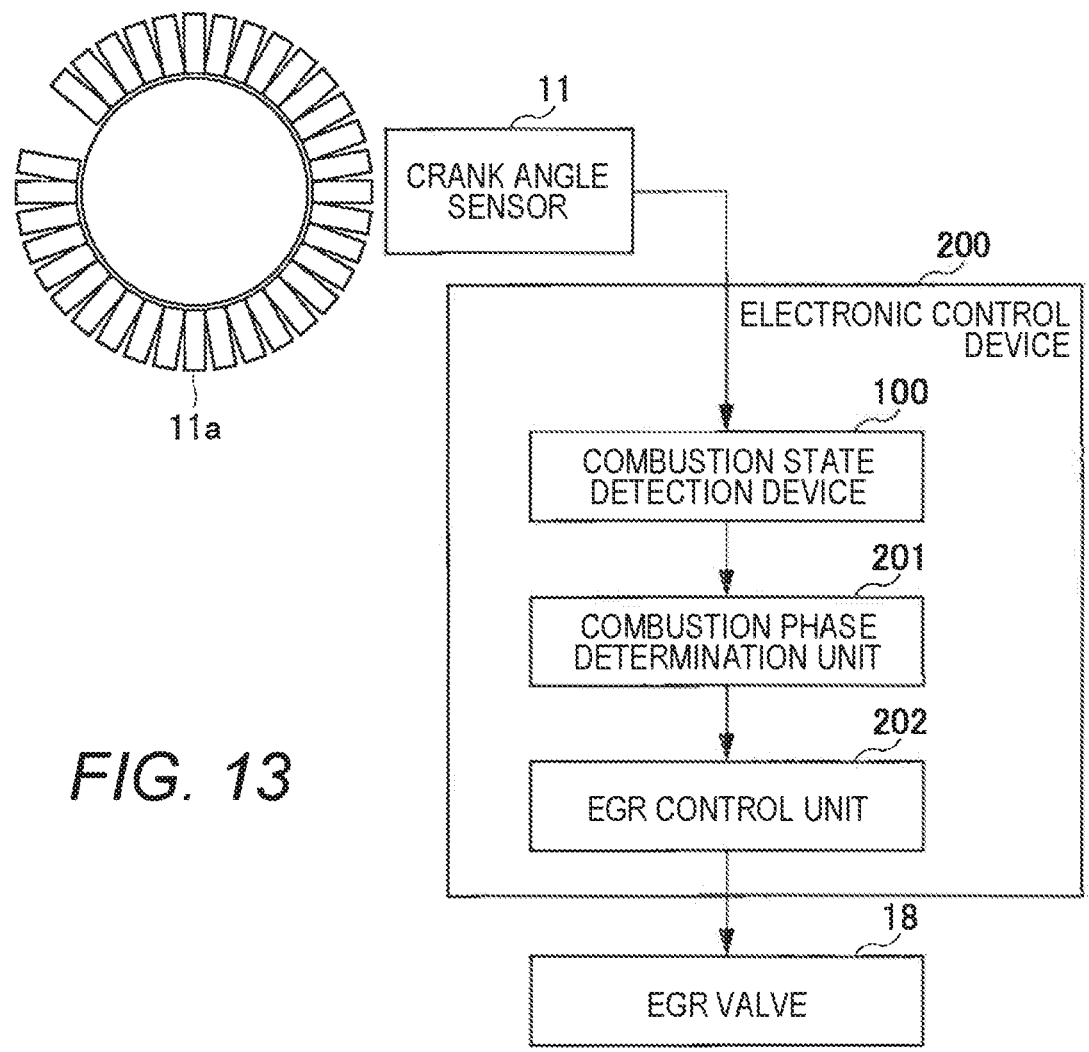
FIG. 13 is a block diagram illustrating a configuration example of EGR rate control by the electronic control device according to the embodiment of the present invention.

The electronic control device illustrated in FIG. 13 performs such processing.

That is, an electronic control device 200 includes the combustion state detection device 100 (FIG. 9), and calculates the combustion phase on the basis of the detection signal of the crank angle sensor 11. As described above, the combustion state detection device 100 here may include a required rotation time calculation unit instead of the rotation speed calculation unit 112.

The information on the combustion phase calculated by the combustion state detection device 100 is supplied to a combustion phase determination unit 201.

The combustion phase determination unit 201 compares the calculated combustion phase with the limit combustion phase as described in [Expression 14]. In addition, the combustion phase determination unit 201 calculates the variation in the combustion phase and compares the calculated variation with the allowable value of the combustion phase variation as described in [Expression 15] to determine whether the combustion state is stable or unstable.

The EGR control unit 202 calculates the set value of the opening degree of the EGR valve 18 so as to increase the EGR rate when the determination result of the combustion phase determination unit 201 is "stable" and to reduce the EGR rate when the determination result is "unstable". This result is output to the EGR valve 18.

By feedback-controlling the EGR rate in this manner, it is possible to reduce a margin obtained by taking into account the individual difference or deterioration of the internal combustion engine or the accuracy of the differential pressure sensor 21 of the EGR valve 18, increase the EGR rate to the limit, and reduce the fuel consumption.

[Modification]

Note that the present invention is not limited to the above-described embodiments, and includes various modifications.

For example, the combustion phase detected by the combustion state detection device 100 can be reflected not only in the EGR rate but also in air-fuel ratio control, ignition timing control, and the like.

That is, even when the horizontal axes of the upper part and the lower part of FIG. 12 represent the air-fuel ratio instead of the EGR rate, the characteristic diagram having the same tendency is obtained.

In a case where the air-fuel ratio control is performed, the threshold of the combustion phase determination unit 201 may be set to correspond to the air-fuel ratio, the EGR control unit 202 may be replaced with an air-fuel ratio control unit, and the fuel injection device 9 may be controlled instead of the EGR valve 18. In this case, the internal combustion engine can be operated at the air-fuel ratio immediately before the combustion becomes unstable, and it is possible to reduce the margin obtained by taking into account the individual difference or deterioration of the internal combustion engine or the accuracy of the differential pressure sensor 21 of the EGR valve 18.

Then, the fuel consumption can be reduced by increasing the air-fuel ratio to the limit. In addition, the reduction effect of NOx emission can also be expected by increasing the air-fuel ratio to the limit in a lean region. The reduction in NOx emission leads to a reduction in the capacity of the exhaust catalyst, so that there is also an effect of cost reduction.

Furthermore, it is also conceivable to control the ignition timing in addition to the EGR rate and the air-fuel ratio.

In ignition, the efficiency is generally increased when the ignition is advanced, so the ignition is advanced until a knock sensor detects knock. Advancing the ignition means advancing the ignition period by a predetermined angle with respect to the top dead center of the crank angle. Here, when the ignition timing is delayed so as to intentionally lower the efficiency of the internal combustion engine for early warming of the air-fuel ratio sensor and the catalyst at the time of starting the internal combustion engine, control is also performed to increase the amount of heat discharged to the exhaust gas accordingly.

FIG. 14 illustrates a relationship between the ignition timing, the combustion phase, and the exhaust heat amount at this time. In the upper part of FIG. 14, a vertical axis represents the combustion phase, and a horizontal axis represents the ignition timing, and in the lower part of FIG. 14, a vertical axis represents the exhaust heat amount, and a horizontal axis represents the ignition timing. Two lines in the upper part of FIG. 14 indicate an upper limit characteristic S61 and a lower limit characteristic S62 of the combustion phase.

As indicated by a characteristic S63 in the lower part of FIG. 14, the exhaust heat amount increases as the ignition timing is delayed, but with this, the combustion phase is delayed and the variation in the combustion phase also increases as shown in the upper part of FIG. 14.

Therefore, similarly to the case of controlling the EGR rate, by determining the stability of the combustion from the combustion phase or the variation thereof, and performing control to delay the ignition timing when the combustion is stable and advance the ignition timing when the combustion is unstable, the ignition timing can be controlled such that the warm-up is accelerated.

Note that on the basis of the combustion phase, the electronic control device 200 may simultaneously control any one of the EGR valve opening degree, the throttle opening degree, the fuel injection amount, or the ignition timing of the internal combustion engine described above. Alternatively, a plurality of the EGR valve opening degree, the throttle opening degree, the fuel injection amount, and the ignition timing of the internal combustion engine may be simultaneously controlled on the basis of the combustion phase.

In addition, the above-described embodiments have been described in detail in order to describe the present invention in an easily understandable manner, and are not necessarily limited to those having all the described configurations. For example, although the electronic control device 200 illustrated in FIG. 13 is configured to incorporate the combustion state detection device 100 illustrated in FIG. 9, the combustion state detection device (combustion state detection system) 100 may be configured as a device separate from the electronic control device 200.

In addition, the configuration of the device illustrated in FIGS. 9 and 13 may be configured by dedicated hardware for executing each processing, but may be configured by a program (software), in which a processor realizes each function, so that a computer is caused to execute the program.

The Information such as a program for realizing each function in this case can be stored in a recording medium such as a memory, an IC card, an SD card, or an optical disk in addition to a nonvolatile storage such as an HDD or an SSD.

In addition, in a case where a part or all of the devices illustrated in FIGS. 9 and 13 are configured by hardware, the devices may be realized by hardware such as a field programmable gate array (FPGA) or an application specific integrated circuit (ASIC).

In addition, in the block diagrams illustrated in FIGS. 9 and 13, only the control lines and the information lines considered to be necessary for the description are illustrated, and not all the control lines and the information lines on the product are necessarily illustrated. It may be considered that almost all the components are connected to each other in actual. In addition, the configuration of the internal combustion engine illustrated in FIG. 1 is also an example, and the internal combustion engine to which the present invention is applied is not limited to the configuration of FIG. 1.

REFERENCE SIGNS LIST 1 air flow sensor
2 compressor
3 intercooler
4 throttle valve
5 cylinder
6 ignition plug
7 intake valve
8 exhaust valve
9 fuel injection valve
10 piston
11 crank angle sensor
12 water temperature sensor
13 turbine
14 three-way catalyst
15 air-fuel ratio sensor
16 EGR passage pipe
17 EGR cooler
18 EGR valve
19 throttle sensor
21 differential pressure sensor
31 crank arm
32 connecting rod
100 combustion state detection device
101 crank angle sensor
110 crank angle synchronization processing unit
111 falling detection unit
112 rotation speed calculation unit
120 time synchronization processing unit
121 upsampling unit
122 filtering processing unit
123 peak search unit
200 electronic control device
201 combustion phase determination unit
202 EGR control unit

The invention claimed is:

1. An electronic control device that controls an internal combustion engine by detecting a combustion state of the internal combustion engine on a basis of a sensor signal of a crank angle sensor that measures rotation of a crankshaft of the internal combustion engine, the electronic control device comprising:
a crank angle synchronization processing unit that calculates a rotation speed or a rotation time of the crankshaft at a certain angle on a basis of a change in the sensor signal; and
a time synchronization processing unit that receives information on the rotation speed or the rotation time for at least two combustion cycles from the crank angle synchronization processing unit when a combustion cylinder of the internal combustion engine is switched, and calculates a combustion phase on a basis of the received rotation speed or rotation time; and
wherein the time synchronization processing unit calculates a combustion torque by performing filtering processing on the received information of the rotation speed or the rotation time with a filter in which a gain is proportional to a frequency up to a predetermined frequency and the gain attenuates at the predetermined frequency or more, and calculates a combustion phase of the internal combustion engine by searching for a peak of the calculated combustion torque.

2. The electronic control device according to claim 1, wherein the time synchronization processing unit upsamples the information of the rotation speed or the rotation time for at least two combustion cycles received from the crank angle synchronization processing unit, and performs the filtering processing on the upsampled information of the rotation time.

3. The electronic control device according to claim 2, wherein the time synchronization processing unit performs upsampling of the sensor signal, as the upsampling, by interpolating the received information of the rotation speed or the rotation time with the sensor signal itself with respect to a timing at which the sensor signal is received and with zero with respect to a timing at which the sensor signal is not received, calculates a combustion torque by performing filtering processing, in which a gain is proportional to a frequency up to a predetermined frequency and the gain attenuates at the predetermined frequency or more, on a result of the upsampling, and calculates a combustion phase of the internal combustion engine by searching for a peak of the calculated combustion torque.

4. The electronic control device according to claim 2, wherein the predetermined frequency at which the gain is attenuated in the filtering processing is a frequency set within a range of two to four times the combustion frequency of the internal combustion engine.

5. The electronic control device according to claim 1, wherein at least one or more of an EGR valve opening degree, a throttle opening degree, a fuel injection amount, and an ignition timing of the internal combustion engine are controlled on a basis of the combustion phase calculated by the time synchronization processing unit.

6. A combustion state detection system that detects a combustion state of the internal combustion engine on a basis of a sensor signal of a crank angle sensor that measures rotation of a crankshaft of the internal combustion engine, the combustion state detection system comprising: a crank angle synchronization processing unit that calculates a rotation speed or a rotation time of the crankshaft at a certain angle on a basis of a change in the sensor signal; and
a time synchronization processing unit that receives information on the rotation speed or the rotation time for at least two combustion cycles from the crank angle synchronization processing unit when a combustion cylinder of the internal combustion engine is switched, and calculates a combustion phase on a basis of the received rotation speed or rotation time;

wherein the time synchronization processing unit calculates a combustion torque by performing filtering processing on the received information of the rotation speed or the rotation time with a filter in which a gain is proportional to a frequency up to a predetermined frequency and the gain attenuates at the predetermined frequency or more, and calculates a combustion phase of the internal combustion engine by searching for a peak of the calculated combustion torque.

* * * * *